United States Patent
Hong

(10) Patent No.: US 7,007,216 B2
(45) Date of Patent: Feb. 28, 2006

(54) RATE-MATCHING ALGORITHM FOR HYBRID ARQ SYSTEM

(75) Inventor: Sung Kwon Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 10/029,253

(22) Filed: Dec. 28, 2001

(65) Prior Publication Data

US 2002/0120900 A1  Aug. 29, 2002

(30) Foreign Application Priority Data

Dec. 29, 2000  (KR) .............................. 2000-85014

(51) Int. Cl.
*H04L 1/18* (2006.01)
(52) U.S. Cl. ...................... 714/748; 370/253; 370/342
(58) Field of Classification Search ................ 714/748, 714/790, 755; 370/342, 232, 253
See application file for complete search history.

(56) References Cited

U.S. PATENT DOCUMENTS

| | | | |
|---|---|---|---|
| 6,181,686 B1 * | 1/2001 | Hamalainen et al. ....... 370/347 |
| 6,226,326 B1 * | 5/2001 | Mihara .................. 375/240.05 |
| 6,345,375 B1 * | 2/2002 | Kelkar et al. ............... 714/748 |
| 6,501,748 B1 * | 12/2002 | Belaïche ..................... 370/342 |
| 6,519,732 B1 * | 2/2003 | Li .............................. 714/755 |
| 6,580,762 B1 * | 6/2003 | Tsumura ..................... 375/295 |
| 6,601,214 B1 * | 7/2003 | Hammons, Jr. ............. 714/790 |
| 6,744,744 B1 * | 6/2004 | Tong et al. ................. 370/320 |
| 6,751,772 B1 * | 6/2004 | Kim et al. .................. 714/786 |
| 2002/0022468 A1 * | 2/2002 | Yoon et al. ................. 455/403 |
| 2002/0027883 A1 * | 3/2002 | Belaiche ..................... 370/252 |
| 2003/0007456 A1 * | 1/2003 | Gupta et al. ................ 370/232 |
| 2004/0081103 A1 * | 4/2004 | Sebire ........................ 370/253 |

* cited by examiner

*Primary Examiner*—Albert Decady
*Assistant Examiner*—John P. Trimmings
(74) *Attorney, Agent, or Firm*—Fleshner & Kim, LLP

(57) ABSTRACT

A method of setting an initial error value of a rate-matching algorithm is disclosed. The method according to the present invention includes determining an original initial error value, which is originally given for a rate-matching algorithm that generates a rate-matching pattern in a hybrid ARQ system. Next, a modular operator K is calculated. Then the method obtains an incremental error value that depends on a number of retransmissions made, and finally it calculates a new initial error value by adding the incremental error value with the original initial error value. As a result, the data bits punctured by coding and rate matching can be transmitted prior to other data bits. In addition, the transmission priority can be given to the data bits that have been transmitted a less number of times.

16 Claims, 2 Drawing Sheets

FIG. 1
BACKGROUND ART

```
01 if puncturing is to be performed
02          e = e_ini
03          m = 1
04          do while m 0 X_i
05                  e = e - e_minus
06                  if e0 0 then
07                          set bit x_{i,m} to δ where δ ∉ {0,1}
08                          e = e + e_plus
09                  end if
10                  m = m+1
11          end do
12 else
13          e = e_ini
14          m = 1
15          do while m0 X_i
16                  e = e - e_minus
17                  do while e 0 0
18                          repeat bit x_{i,m}
19                          e = e + e_plus
20                  end do
21                  m = m+1
22          end do
23 end if
```

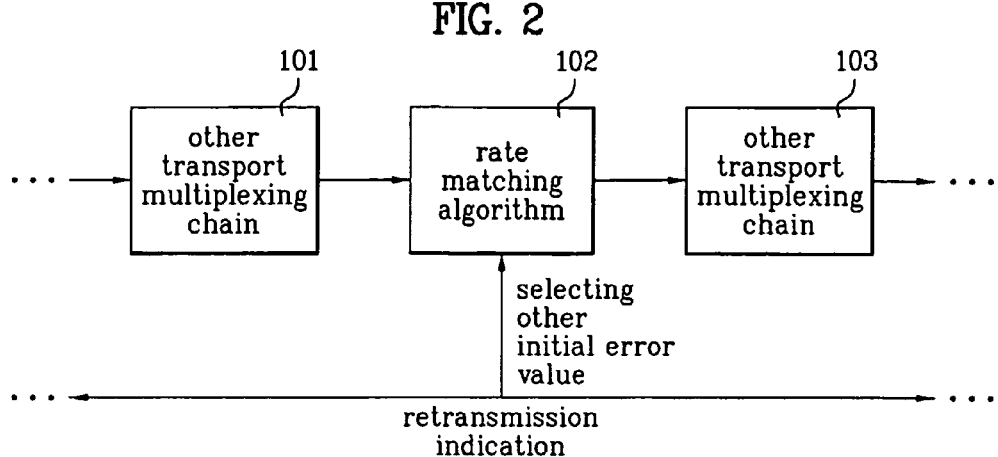
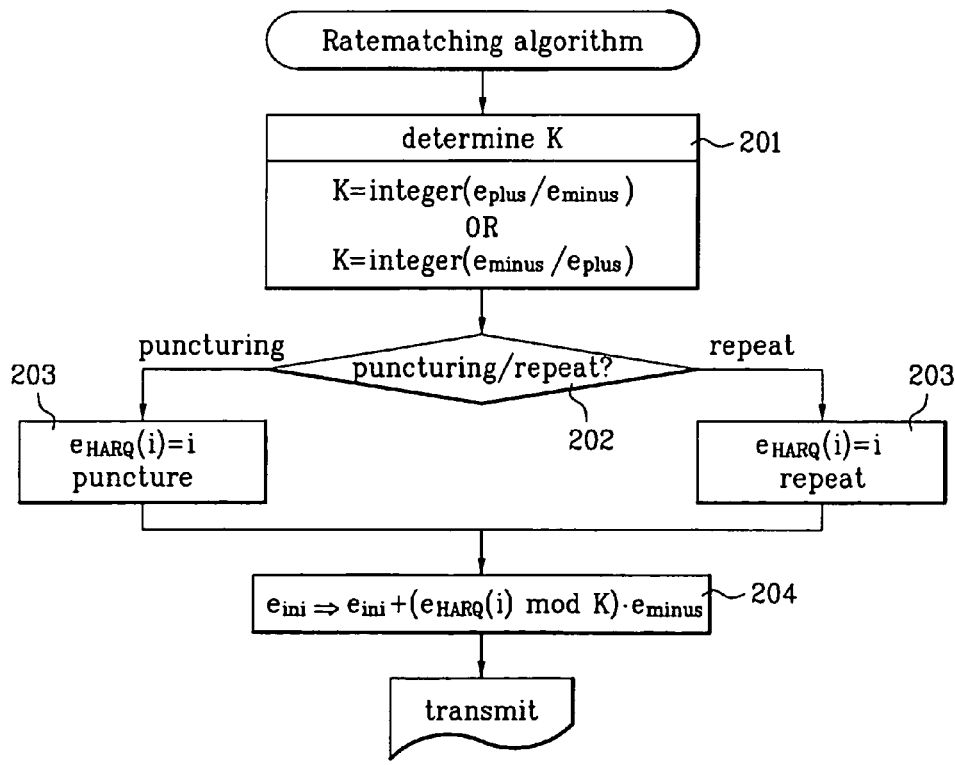

RATE-MATCHING ALGORITHM FOR HYBRID ARQ SYSTEM

This application claims the benefit of the Korean Application No. P2000-85014 filed on Dec. 29, 2000, which is hereby incorporated by reference.

BACKGROUND OF THE INVENTION

1. Field of the Invention

The present invention relates to an Automatic Repeat Request (ARQ) system, and more particularly, to a rate-matching algorithm of a Wideband Code Division Multiple Access (WCDMA) Hybrid ARQ system. Although the present invention is suitable for a wide scope of applications, it is particularly suitable for Hybrid ARQ type II systems with full retransmission.

2. Discussion of the Related Art

Generally, the automatic repeat request (ARQ) and forward error correction (FEC) techniques are well-known error control techniques commonly employed in many communication systems.

In a communication system that employs the ARQ technique, a receiving system makes requests to re-transmit data if the data were received erroneously. Therefore, an object of ARQ is to increase the reliability of the packet data transmission by re-transmitting the same data to the receiving system until the receiving system receives the data error-free. ARQ techniques provide very reliable communication, however they often introduce undesirable delays, decreasing the data throughput rate of the system.

On the other hand, the FEC technique fixes such delay errors by using an error correction code. Therefore, an object of a Hybrid ARQ system, in which both ARQ and FEC techniques are combined, is to have the delay error correction capability of the FEC technique and the low error rates of the standard ARQ technique.

The coding rate of the channel code in an adaptive hybrid ARQ system starts from a source-coding rate, and it decreases as the number of retransmission increases in order to increase reliability of the data transmission. Such hybrid ARQ technique being adaptive to channel environments is essential to a system that provides a multimedia service.

The adaptive ARQ technique is based on an adaptive error correction technique: the number of the surplus data bits gradually increases during the retransmission process. In addition, the adaptive ARQ technique uses one of a "stop and wait", "go back N", and "selective repeat" protocol method, and a data packet having a length L includes n information bits and m tail bits.

A typical hybrid ARQ system starts to transmit the data encoded with a reasonably high coding rate, and a mobile station requests to resend the data (sends NAK) if they were received erroneously. Then, the transmitting system, which receives NAK, sends an incremental code word encoded with a lower coding rate.

The hybrid ARQ system often uses any one of convolutional or turbo encoding techniques for encoding a code, and the hybrid ARQ system can be classified into a type II or type III system based on whether the encoded code is a Rate Compatible Punctured (RCP) code or a Complementary Punctured (CP) code. In addition, the system is classified into type I system for re-transmitting the same signal.

There are four different types of hybrid ARQ system: (1) Hybrid ARQ type I system without code combining, (2) Hybrid AIRQ type I system with code combining, (3) Hybrid ARQ type II system with full retransmission, and (4) Hybrid ARQ type II system with partial retransmission.

(I) Hybrid ARQ Type I System Without Code Combining

In this system, a transmitter adds a CRC code to a data packet and performs an error correction coding process before sending the packet. Then, a receiver performs a CRC inspection and requests to retransmit if any error exists. Thereafter, the transmitter resends a same packet, and the receiver decodes the retransmitted packet independently. This system is set as "working assumption" in current 3GPP standards.

(2) Hybrid ARQ Type I System With Code Combining

This system is similar to the Hybrid ARQ type I system shown above except that the receiver initially combines the originally transmitted packet with the retransmitted packet, and it decodes the combined packet. It requires an additional memory space, and the number of data bits representing a symbol for combining must be considered.

(3) Hybrid ARQ type II System With Full Retransmission

In this system, the sender transmits an incremental redundancy after sending a data packet.

(4) Hybrid ARQ Type II System With Partial Retransmission

This system is identical to the Hybrid ARQ type II system with full retransmission except that the re-transmitted data is only partially retransmitted and the size of the incremental redundancy is smaller than the size of the original data pocket.

The current Third Generation Partner Project (3GPP) meetings for WCDMA standards are only trying to decide what type of ARQ system should be used. Therefore, it is crucially important to provide the specific algorithms for hybrid ARQ systems. In addition, in order to achieve the optimal result, various techniques and modification should be applied to such algorithms.

SUMMARY OF THE INVENTION

Accordingly, the present invention is directed to a method of setting an initial error value of a rate-matching algorithm that substantially obviates one or more problems due to limitations and disadvantages of the related art.

An object of the present invention is to provide a method of setting an initial error value that depends on the number of retransmissions made for a rate-matching algorithm of a hybrid ARQ system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of setting an initial error value of a rate-matching algorithm in a hybrid ARQ system includes (a) determining an original initial error value which is originally given for a rate-matching algorithm generating a rate-matching pattern for a hybrid ARQ system, (b) calculating a modular operator K, (c) calculating a first incremental value, the first incremental value depending on a number of retransmissions made, and (d) calculating a new initial error value by adding a second incremental value to the original initial value, the second incremental value depending on the first incremental value.

The modular operator K is obtained by $$K = \begin{cases} \text{integer}\left(\dfrac{e_{plus}}{e_{minus}}\right), & \text{if } \left(\dfrac{e_{plus}}{e_{minus}}\right) \geq 1 \\ \text{integer}\left(\dfrac{e_{minus}}{e_{plus}}\right), & \text{if } \left(\dfrac{e_{plus}}{e_{minus}}\right) < 1 \end{cases},$$

where $e_{plus}$ and $e_{minus}$ are originally given, and integer (A) is defined by integer(A)=N(A) or N(A)+1, where N(A) represents the maximum of a set of integer numbers being less than A.

The first incremental value is obtained by $$e_{HARQ}(i)=i \text{ or } PBR_{i\%K},$$

where $e_{HARQ}(i)$ represents the first incremental value, and i represents the number of retransmissions made. $PBR_{i\%K}$ represents a first list of numbers obtained by excluding any number being greater than or equal to K from $BR_{j,n}$, where $BR_{j,n}$ represents a second list of numbers obtained by bit-reversing j with n, and n represents any integer number that satisfies $2^{n-1} < K \leq 2^n$.

Finally, the new initial error value is obtained by $$e_{int\text{-}new}=e_{int\text{-}old}+(e_{HARQ}(i) \bmod K)\cdot e_{minus},$$

where $e_{int\text{-}new}$ represents the new initial error value, and $e_{int\text{-}old}$ represents the original initial error value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 1 illustrates an existing rate-matching algorithm of generating a rate-matching pattern for a hybrid ARQ type II system;

FIG. 2 illustrates a graphical presentation showing how the rate-matching algorithm is invoked in a hybrid ARQ type II system; and FIG. 3 illustrates a method of setting an initial error value of a rate-matching algorithm for a hybrid ARQ type II system in accordance with the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The current Third Generation Partner Project (3GGP) meetings for WCDMA standards are trying only to decide what type of ARQ system should be used. Therefore, various techniques and modifications must be made to provide a specific algorithm for hybrid ARQ systems in order to achieve the maximum result.

One of the crucially important facts of achieving the maximum result for a Hybrid ARQ type II system (with full retransmission) is that the data bits punctured by coding and rate-matching must be transmitted prior to the data bits which were not punctured and transmitted previously. In addition to that, the data bits transmitted many times should be transmitted subsequent to the data bits transmitted a less number of times.

Therefore, using the method of setting the initial error value of the rate-matching algorithm in accordance with the present invention, the system is able to give priorities to the data bits transmitted fewer times.

FIG. 1 illustrates an existing algorithm for generating a rate-matching pattern for a hybrid ARQ type II system with full transmission according to the background art.

In the algorithm shown in FIG. 1, $e_{int}$, $e_{plus}$, $e_{minus}$, and $X_i$ are initially given. $x_{i1}, x_{i2}, x_{i3}, \ldots$, and $x_{iX_i}$ represent the data bits being processed, where $X_i$ represents a total number of the data bits, and i represents the transport channel number. $e_{int}$ represents an initial error value, and m represents the index of a current data bit.

FIG. 2 is a graphical presentation of how a rate-matching algorithm 102 is invoked in a hybrid ARQ system in accordance with the present invention. It will be assumed that the size of the packet being retransmitted is identical to the size of the packet previously transmitted. As shown in FIG. 2, the Initial value of the algorithm depends on the number of retransmissions made. FIG. 2 also illustrates other transport multiplexing chains 101 and 103.

FIG. 3 illustrates a method of setting an initial error value of a rate-matching algorithm for a WCDMA hybrid ARQ system in accordance with the present invention. In the flow chart shown in FIG. 3, i represents a number of retransmissions. Therefore, i set to 0 represents the first transmission, and i set to 1 represents the second transmission.

First of all, a modular operator K is determined by $$K = \begin{cases} \text{integer}\left(\dfrac{e_{plus}}{e_{minus}}\right), & \text{if } \left(\dfrac{e_{plus}}{e_{minus}}\right) \geq 1 \\ \text{integer}\left(\dfrac{e_{minus}}{e_{plus}}\right), & \text{if } \left(\dfrac{e_{plus}}{e_{minus}}\right) < 1 \end{cases},$$

where integer (A) is defined as N(A) or N(A)+1, and N(A) represents the maximum of the integer numbers being less than A (S201).

Next, the algorithm checks whether it is a "puncturing" mode or "repeat" mode (S202).

If it is a "puncturing" mode, the algorithm sets the incremental value $e_{HARQ}(i)$ to i. Similarly, if it is a "repeat" mode, the algorithm sets $e_{HARQ}(i)$ to i (S203).

Finally, the new initial error value is determined by $$e_{int}=e_{int}+(e_{HARQ}(i) \bmod K)\cdot e_{minus} \text{ (S204)}.$$

Alternatively, the incremental value $e_{HARQ}(i)$ can be set as $$e_{HARQ}(i)=PBR_{i\%K},$$

where $PBR_{i\%K}$ represents a list of numbers obtained by excluding any number greater than or equal to K from $BR_{j,n}$.

$BR_{j,n}$ represents the values obtained by bit-reversing j with n (e.g., $BR_{0,3}=0$ and $BR_{1,3}=4$), where n represents an integer number that $2^{n-1} < K \leq 2^n$.

For example, let's assume K=6 and n=3. Then $BR_{0,n}=0$ (000→000), $BR_{1,n}=4$(001→100), $BR_{2,n}=2$(010→010), $BR_{3,n}=6$(011→101), $BR_{4,n}=1$(100→001), $BR_{5,n}=5$(101→101), $BR_{6,n}=3$(110→011), $BR_{7,n}=7$(111→111), and $PBR_0=0$, $PBR_1=4$, $PBR_2=2$, $PBR_3=1$, $PBR_4=5$, $PBR_5=3$.

The method of setting an initial error value for the algorithm generating a rate-matching pattern can be applied to not only a downward link but also to an upward link. When the Transmission Time Interval (TTI) is set to a value greater than 1 for an upward link, an initial error value is set for each frame. Then the method described above can be used for setting the initial error value for each frame.

In addition, since the method of setting an initial error value in accordance with the present invention is based on code combining, it can be further applied to any other application that uses the code combining.

In conclusion, in the method of setting an initial error value in accordance with the present invention, the initial error value depends on the number of transmissions made. Therefore, the maximum result can be obtained for the Hybrid ARQ type II system with full retransmission.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of setting an initial error value of a rate-matching algorithm in a hybrid ARQ (Automatic Repeat Request) system, the method comprising:
    determining an original initial error value, which is originally given for a rate-matching algorithm generating a rate-matching pattern for the hybrid ARQ system;
    calculating an incremental error value that depends on a number of retransmissions made; and
    calculating a new initial error value by adding said incremental error value with said original initial error value, said new initial error value being used to determine puncturing or repeating bit positions of a data frame.

2. The method of claim 1, further comprising calculating a modular K using the following equation:

$$K = \begin{cases} \text{integer}\left(\dfrac{e_{plus}}{e_{minus}}\right), & \text{if } \left(\dfrac{e_{plus}}{e_{minus}}\right) \geq 1 \\ \text{integer}\left(\dfrac{e_{minus}}{e_{plus}}\right), & \text{if } \left(\dfrac{e_{plus}}{e_{minus}}\right) < 1 \end{cases},$$

where $e_{plus}$ and $e_{minus}$ are originally given, and integer (A) is defined by integer(A)=N(A) or N(A)+1, and where N(A) represents the maximum of a set of integer numbers being less than A.

3. The method of claim 2, wherein said incremental value is obtained by incremental error value=$(i \bmod K) \cdot e_{minus}$.

4. The method of claim 1, wherein said new initial error value is used for a downward link or an upward link.

5. A method of setting an initial error value of a rate-matching algorithm in a hybrid ARQ (Automatic Repeat Request) system, the method:
    determining an original initial error value, which is originally given for a rate-matching algorithm generating a rate-matching pattern for the hybrid ARQ system;
    calculating a first incremental value for a puncturing mode, said first incremental value depending on a number of retransmissions made; and
    calculating a new initial error value by adding a second incremental value to said original initial value, said second incremental value depending on said first incremental value and said new initial error value being used to determine puncturing or repeating bit positions of a data frame.

6. The method of claim 5, further comprising calculating a modular K using the following equation:

$$K = \begin{cases} \text{integer}\left(\dfrac{e_{plus}}{e_{minus}}\right), & \text{if } \left(\dfrac{e_{plus}}{e_{minus}}\right) \geq 1 \\ \text{integer}\left(\dfrac{e_{minus}}{e_{plus}}\right), & \text{if } \left(\dfrac{e_{plus}}{e_{minus}}\right) < 1 \end{cases},$$

where $e_{plus}$ and $e_{minus}$ are originally given, and integer (A) is defined by integer(A)=N(A) or N(A)+1, and where N(A) represents the maximum of a set of integer numbers being less than A.

7. The method of claim 6, wherein said first incremental value is obtained by $e_{HARQ}(i)=i$, where $e_{HARQ}(i)$ represents said first incremental value, and i represents said number of retransmissions made.

8. The method of claim 7, wherein said new initial error value is obtained by $e_{ini-new}=e_{ini-old}+(e_{HARQ}(i) \bmod K) \cdot e_{minus}$, where $e_{ini-new}$ represents said new initial error value, and $e_{ini-old}$ represents said original initial error value.

9. The method of claim 6, wherein said first incremental value is obtained by $e_{HARQ}(i)=PBR_{i\%K}$, where $PBR_{i\%K}$ represents a first list of numbers obtained by excluding any number being greater than or equal to K from $BR_{j,n}$, and where $BR_{j,n}$ represents a second list of numbers obtained by bit-reversing j with n, and n represents any integer number that satisfies $2^{n-1} > K \leq 2^n$.

10. The method of claim 9, wherein said new initial error value is obtained by $e_{ini-new}=e_{ini-old}+(e_{HARQ}(i) \bmod K) \cdot e_{minus}$, where $e_{ini-new}$ represents said new initial error value, and $e_{ini-old}$ represents said original initial error value.

11. A method of setting an initial error value of a rate-matching algorithm in a hybrid ARQ system, the method comprising:
    determining an original initial error value, which is originally given for a rate-matching algorithm generating a rate-matching pattern for the hybrid ARQ system;
    calculating a first incremental value for a repeating mode, said first incremental value depending on a number of retransmissions made; and calculating a new initial error value by adding a second incremental value to said original initial value, said second incremental value depending on said first incremental value and said new initial error value being used to determine bits that are to be punctured or repeated in a data frame.

12. The method of claim 11, further comprising calculating a modular K using the following equation:

$$K = \begin{cases} \text{integer}\left(\frac{e_{plus}}{e_{minus}}\right), & \text{if } \left(\frac{e_{plus}}{e_{minus}}\right) \geq 1 \\ \text{integer}\left(\frac{e_{minus}}{e_{plus}}\right), & \text{if } \left(\frac{e_{plus}}{e_{minus}}\right) < 1 \end{cases},$$

where $e_{plus}$ and $e_{minus}$ are originally given, and integer (A) is defined by $$\text{integer}(A) = N(A) \text{ or } N(A)+1, \text{ and}$$

where N(A) represents the maximum of a set of integer numbers being less than A.

13. The method of claim 12, wherein said first incremental value is obtained by $$e_{HARQ}(i) = i,$$

where $e_{HARQ}(i)$ represents said first incremental value, and i represents said number of retransn-iissions made.

14. The method of claim 13, wherein said new initial error value is obtained by $$e_{ini-new} = e_{ini-old} + (e_{HARQ}(i) \bmod K) \cdot e_{minus},$$

where $e_{ini-new}$ represents said new initial error value, and $e_{ini-old}$ represents said original initial error value.

15. The method of claim 12, wherein said first incremental value is obtained by $$e_{HARQ}(i) = PBR_{i\%K},$$

where $PBR_{i\%K}$ represents a first list of numbers obtained by excluding any number being greater than or equal to K from $BR_{j,n}$, and where $BR_{j,n}$ represents a second list of numbers obtained by bit-reversing j with n, and n represents any integer number that satisfies $2^{n-1} > k \leq 2^n$.

16. The method of claim 15, wherein said new initial error value is obtained by $$e_{ini-new} = e_{ini-old} + (e_{HARQ}(i) \bmod K) \cdot e_{minus},$$

where $e_{ini-new}$ represents said new initial error value, and $e_{ini-old}$ represents said original initial error value.

* * * * *